May 19, 1931.  T. H. THOMAS  1,805,647
TRAIN PIPE COUPLING
Filed Sept. 17, 1928
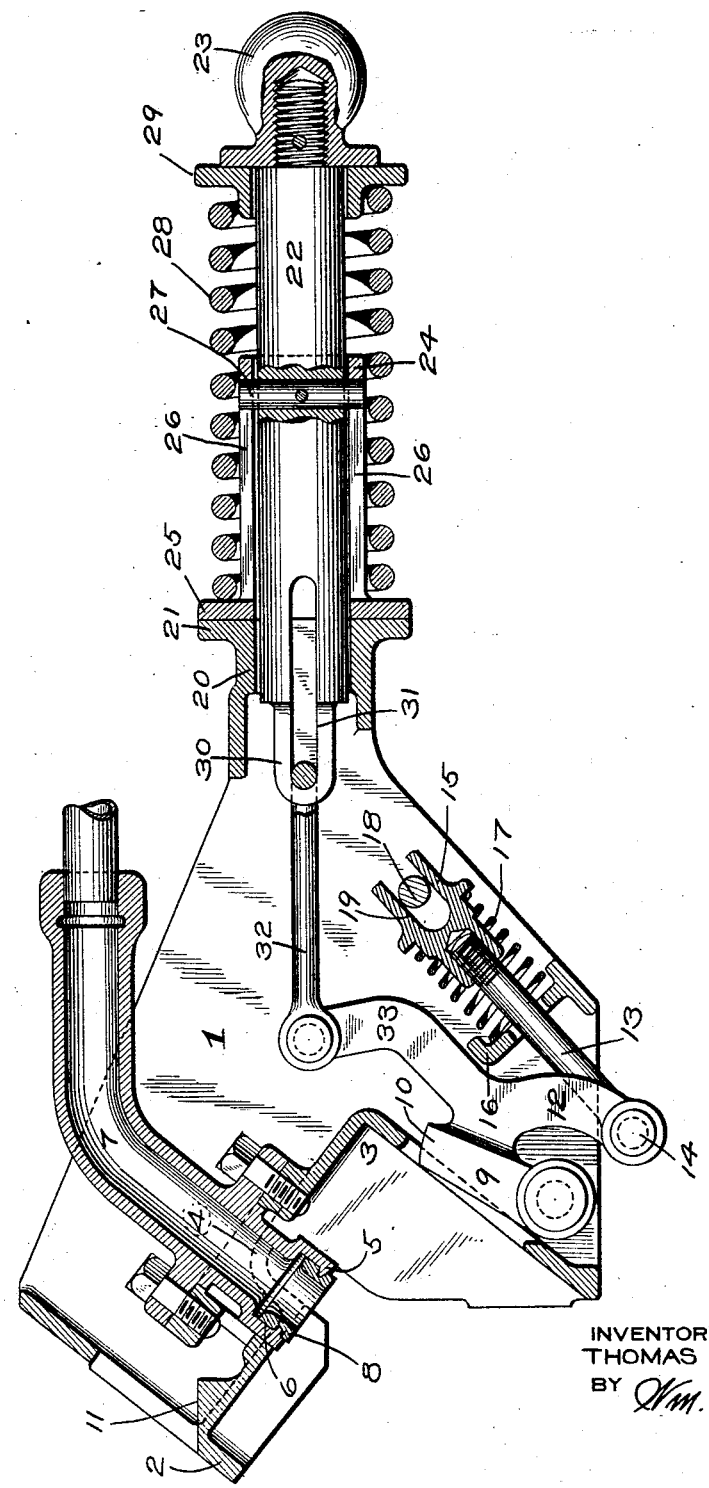
INVENTOR
THOMAS H. THOMAS
BY *Wm. M. Cady*
ATTORNEY Patented May 19, 1931

1,805,647

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRAIN PIPE COUPLING

Application filed September 17, 1928. Serial No. 306,510.

This invention relates to automatic train pipe couplings, and more particularly to the type known as the tight or rigid lock coupling.

An object of the invention is to provide a train pipe coupling of the above mentioned type wherein the interlocked parts are positively unlocked when cars are separated.

Another object of the invention is to provide a coupling wherein the interlocking parts are positively moved to full unlocked position when the couplings are separated.

The invention also comprises certain new and useful improvements in the construction, arrangement and combination of the several parts of which it is composed, as will be hereinafter more fully described and claimed.

In the accompanying drawing, the single figure is a longitudinal section of an automatic train pipe coupling embodying my invention, showing the latch in uncoupled position.

Train pipe couplings of the type known as the tight or rigid lock coupling, are shown for example, in the Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers or latches, one pivoted upon each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together it is necessary to manually operate the cam levers, when it is desired to uncouple, in order to release the locking of the coupling heads and thus permit the coupling heads to separate, when the cars are pulled apart.

By the present invention, means are provided for automatically moving the cam levers from locked to unlocked position when the coupling heads are separated and for retaining the cam levers in unlocked position while the couplers are uncoupled.

Referring to the drawing, the automatic train pipe coupling head 1 comprises a projecting nose 2 adapted to engage in a recess 3 of a counterpart coupling head. The head 1 is provided with hooked portions 4 arranged above and below a plane surface 5, the hooked portion of one coupling head being adapted to engage and interlock with a corresponding hook portion of a counterpart coupling head, in the manner fully described in the above mentioned Westinghouse patent.

The plane surface 5 is provided with one or more openings 6 for train pipe sections, each having a passage 7. The forward end of the train pipe opening is provided with a gasket 8 adapted to engage the corresponding gasket on the other coupling, and make a fluid tight joint when the heads are coupled together.

The coupling head is provided with a pivoted cam or latch lever 9 having a cam surface 10 for engaging a face 11 of a counterpart coupling head.

The lever 9 carries an arm 12 to which a rod 13 is pivotally connected by a pin 14. A member 15 is secured to the outer end of the rod 13, and interposed between said member and a fixed abutment 16 is a coil spring 17. A guide pin 18, secured to the coupling head, is adapted to engage in a slot 19 provided in the member 15.

The rear end of the coupling head is formed with an opening 20 which constitutes a guide for the forward end of a stem 22. The end face of the coupling head is extended to provide a flange 21.

The stem 22 has its rear end provided with a ball section 23 adapted to be mounted in a socket (not shown) carried by the car.

Carried by the stem 22 is a sleeve 24 having one end flanged at 25 for abutting the flange 21. The sleeve 24 is formed with diametrically disposed longitudinal slots 26 into which the projecting ends of a pin 27 passed through the stem 22 extend.

A coil spring 28 encircles the stem 22 and the sleeve 24, one end of the spring bearing against the flange 25, while the opposite end thereof bears against a collar 29 at the inner end of the stem.

The spring 28 is normally under initial compression which tends to hold the parts in the position shown, with the pin 27 engaging the extreme ends of the slots 26. However, the spring 28 is adapted to be compressed to permit telescoping of the stem 22 and the coupling head when two cars are coupled together, whereby the forward end of the stem will be disposed further into the coupling head for a purpose to be described.

At the front end, the stem 22 is provided with an extended portion 30 having a longitudinal slot 31 and engaging in said slot is a link 32 which is pivotally connected to a lever arm 33 carried by the cam lever 9. As shown, the slot 31 may be extended for a distance into the stem 22 to increase the length thereof with respect to the length of the portion 30.

In operation, when cars are brought together for coupling up, the projecting nose 2 of one train pipe coupling enters the recess 3 of the counterpart coupling. The hooked portions 4 of the two couplings become interlocked through the relative lateral and longitudinal movement and the plane faces 5 meet, so that the train pipe openings therein are connected together.

When the train pipe coupling head on each car moves rearwardly on the stem 22, the sleeve 24 will be carried with it, thereby compressing the spring 28 between the flange 25 and collar 29 which are brought closer together.

When the coupling head and stem 22 are thus telescoped together, the U-shaped link 32 will be carried rearwardly of the slot 31 and the pressure of spring 17 will force the lever 9 outwardly towards the nose 2 so that the cam face 10 engages the face 11 of the counterpart coupling head and locks the two coupling heads tightly together.

Inasmuch as the coupling heads will be held telescoped on the stems 22 when the car couplers are locked together, the loop ends of the links 32 will not engage the outer ends of the slots 31. Therefore, the levers 9 will be retained in locked position by the pressure exerted by the springs 17. The latches will remain in such position as long as the cars remain coupled together by virtue of the lost motion provided by the slotted connections between the several parts.

When coupled cars are separated, the interlocked coupling heads 1 will be pulled outwardly on the stems 22, until further longitudinal movement is prevented by the pins 27 engaging the ends of the slots 26, as shown in the drawing. This action will also pull the links 32 to the outer end of the slots 31 whereupon the levers 9 will be swung backwardly out of engagement with the faces 11, thereby permitting the automatic unlocking of the coupling heads.

When the coupling heads separate, the springs 28 will maintain the parts in the extended position shown, ready for coupling up, and the levers 9 will therefore be retained in unlocked position within the coupling heads.

The functional and structural objects above stated are thus seen to be obtained in the construction described. It is to be understood that certain features of the invention are capable of modification and combination in couplings of other types without sacrifice of the attendant advantages.

Having now described my invention, what I claim as new and desire to secure by Letters Patent, is:—

1. The combination with a train pipe coupling adapted to couple with a counterpart coupling and having means for locking the couplings in the coupled position, of a spring acting on the locking means and tending to move the same to the locked position, a second spring acting on the locking means and tending to move the same to the unlocked position, and means for relieving the locking means of the pressure of the second spring upon movement of the couplings to the coupled position.

2. The combination with a train pipe coupling adapted to couple with a counterpart coupling and having means for locking the couplings in the coupled position, of a spring acting on the locking means and tending to move the same to the unlocked position, and means operated upon the coming together of counterpart couplings for relieving the locking means of the pressure of the spring.

3. In a train pipe coupling, a stem, a coupling head telescopingly mounted on the stem, a latch pivotally mounted in the stem for movement relative thereto, an arm projecting from the latch, a rod pivotally connected to the arm, a fixed abutment carried by the coupling head, a spring bearing against the fixed abutment and the rod for urging said latch outwardly from the coupling head, a second arm projecting from the latch, a slot formed in the outer end portion of the stem, a link having one end connected to the second arm and its other end connected to the stem and disposed in said slot for movement relative to the stem, and a spring carried by said stem for urging the coupling head outwardly therefrom when the coupling is uncoupled and for maintaining the link in the end of said slot whereby said latch is retracted inwardly of the coupling head.

In testimony whereof I have hereunto set my hand.

THOMAS H. THOMAS.